US008725519B2

(12) United States Patent
Lee et al.

(10) Patent No.: US 8,725,519 B2

(45) Date of Patent: May 13, 2014

(54) AUDIO ENCODING AND DECODING APPARATUS AND METHOD THEREOF

(75) Inventors: Geon-hyoung Lee, Hwaseong-si (KR); Jae-one Oh, Yongin-si (KR); Chul-woo Lee, Suwon-si (KR); Jong-hoon Jeong, Suwon-si (KR); Nam-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1300 days.

(21) Appl. No.: 11/954,286

(22) Filed: Dec. 12, 2007

(65) Prior Publication Data

US 2008/0162149 A1 Jul. 3, 2008

(30) Foreign Application Priority Data

Dec. 29, 2006 (KR) ........................ 10-2006-0138785

(51) Int. Cl.
*G01L 19/00* (2006.01)
*G01L 21/00* (2006.01)

(52) U.S. Cl.
USPC ......................... 704/500; 704/200.1; 704/503

(58) Field of Classification Search
USPC .................................................. 704/500–504
See application file for complete search history.

(56) References Cited

U.S. PATENT DOCUMENTS

| | | | | |
|---|---|---|---|---|
| 5,347,305 | A | 9/1994 | Bush et al. | |
| 5,886,276 | A * | 3/1999 | Levine et al. | 84/603 |
| 5,956,373 | A | 9/1999 | Goldston et al. | |
| 6,266,644 | B1 | 7/2001 | Levine | |
| 6,947,888 | B1 * | 9/2005 | Huang | 704/214 |
| 7,272,556 | B1 * | 9/2007 | Aguilar et al. | 704/230 |
| 7,921,007 | B2 * | 4/2011 | Van de Par et al. | 704/200.1 |
| 2002/0007268 | A1 * | 1/2002 | Oomen et al. | 704/206 |
| 2002/0018490 | A1 * | 2/2002 | Abrahamsson et al. | 370/477 |
| 2003/0009332 | A1 | 1/2003 | Heusdens et al. | |
| 2005/0010396 | A1 * | 1/2005 | Chiu et al. | 704/200.1 |
| 2006/0015328 | A1 * | 1/2006 | Van Schijndel et al. | 704/219 |
| 2007/0198274 | A1 * | 8/2007 | Van De Par et al. | 704/500 |

FOREIGN PATENT DOCUMENTS

| | | | |
|---|---|---|---|
| CN | 1408110 | A | 4/2003 |
| KR | 10-2002-0070373 | A | 9/2002 |
| KR | 1020050086762 | A | 8/2005 |
| WO | WO 0237476 | A1 | 5/2002 |
| WO | 2006018748 | A1 | 2/2006 |

OTHER PUBLICATIONS

Puri, A, and Chen, T. “Multimedia Systems, Standards, and Networks.” Marcel Dekker, Inc; New York, 2000.*

(Continued)

*Primary Examiner* — Shaun Roberts
(74) *Attorney, Agent, or Firm* — Sughrue Mion, PLLC

(57) ABSTRACT

Provided are audio encoding and decoding apparatuses capable of recovering a high-quality audio signal at a low bit rate. The audio encoding method includes: detecting at least one sinusoidal wave from an input audio signal; calculating components of additional basis vectors based on residual audio signals and the additional basis vectors of the sinusoidal wave; determining transmission of components of the additional basis vectors; and at least one of (a) encoding frequencies and (b) phases and amplitudes of the sinusoidal waves when the transmission of the components of the additional basis vectors are determined, wherein the residual audio signals are obtained by excluding the detected sinusoidal waves from the input audio signal.

25 Claims, 8 Drawing Sheets

(56) References Cited

OTHER PUBLICATIONS

Jensen, Jesper, and Richard Heusdens. "A comparison of differential schemes for low-rate sinusoidal audio coding." Applications of Signal Processing to Audio and Acoustics, 2003 IEEE Workshop on.. IEEE, 2003.*

Vafin, Renat, and W. Bastiaan Kleijn. "Jointly optimal quantization of parameters in sinusoidal audio coding." Applications of Signal Processing to Audio and Acoustics, 2005. IEEE Workshop on. IEEE, 2005.*

Raad, M., L. S. Burnett, and A. Mertins. "Scalable audio coding employing sorted sinusoidal parameters." Signal Processing and its Applications, Sixth International, Symposium on. 2001. vol. 1. IEEE, 2001.*

Heusdens, Richard, Renat Vafin, and W. Bastiaan Kleijn. "Sinusoidal modeling using psychoacoustic-adaptive matching pursuits." Signal Processing Letters, IEEE 9.8 (2002): 262-265.*

Communication dated May 30, 2012, issued by the State Intellectual Property of P.R. China in counterpart Chinese Patent Application No. 200780047233.5.

Communication dated Dec. 23, 2011, issued by the State Intellectual Property Office of P.R. China in counterpart Chinese Application No. 200780047233.5.

Communication dated Sep. 2, 2011 issued by the European Patent Office in counterpart Application No. 07851812.3.

George E B er al; "Perceptual considerations in a low bit rate sinusoidal vocoder", Proceedings of the Annual International Phoenix Conference on Computers and Communications. Scottsdale, Mar. 21-23, 1990; [Proceedings of the Annual International Phoenix Conference on Computers and Communications] Los.

Heusdens R et al: "Sinusoidal modeling of audio and speech using psychoacoustic-adaptive matching pursuits", 2001 IEEE International Conference on Acoustics, Speech, and Signal Processing. Proceedings. (ICASSP). Salt Lake City, UT, May 7-11, 2001: [IEEE International Conference on Acoustics Speech and Signal Processing (ICASSP)].

Communication, dated May 16, 2013, issued by the Korean Patent Office in counterpart Korean Application No. 10-2006-0138785.

* cited by examiner

AUDIO ENCODING AND DECODING APPARATUS AND METHOD THEREOF

CROSS-REFERENCE TO RELATED PATENT APPLICATION

This application claims priority under 35 U.S.C. §119 from Korean Patent Application No. 10-2006-0138785, filed on Dec. 29, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to audio encoding and decoding apparatuses and, and more particularly, to audio encoding and decoding capable of recovering a high-quality audio signal at a low bit rate.

2. Description of the Related Art

In related art audio encoding apparatuses, a time-frequency transform encoding scheme has been used. The time-frequency transform encoding scheme transforms an audio signal in a frequency space to obtain coefficients by using a modified discrete cosine transform (MDCT) and the obtained coefficients are encoded. However, the time-frequency transform encoding scheme has a problem in that quality of audio deteriorates at a low target bit rate.

As an example of a method of encoding an audio signal at a low bit rate, there is a parametric encoding method. In the parametric encoding method, sinusoidal waves are detected from the input audio signal, and frequencies, phases, and amplitudes of the sinusoidal waves are encoded. Specifically, it is possible to encode the input audio signal at a low bit rate in the parametric encoding method as it can have an effect of encoding many MDCT coefficients, even though it encodes by detecting a few sinusoidal waves having a large amplitude from the input audio signal.

However, in the parametric encoding method, in order to recover a high-quality audio signal, a large number of the sinusoidal waves need to be detected from the input audio signal. According to the parametric method, in a case where a frequency and amplitude of the input audio signal is constructed with a fixed sinusoidal wave, the audio signal can be sufficiently recovered by encoding one amplitude, one frequency, and one phase.

On the other hand, in a case where the frequency and amplitude of the input audio signal is constructed with a plurality of sinusoidal waves, in order to recover a high-quality audio signal, a large number of sinusoidal waves needs to be detected from the input audio signal, and the amplitudes, the frequencies, and the phases of the detected sinusoidal waves are encoded, so that encoding efficiencies deteriorate.

The parametric encoding method is suitable for a sinusoidal wave of which frequency is not changed according to time. However, since the frequency and the phase of the sinusoidal wave may be changed according to time due to noise or the like, the number of to-be-detected sinusoidal waves increases. Therefore, the parametric encoding method may be very inefficient.

That is, as the number of the detected sinusoidal waves increases, the number of the to-be-encoded amplitudes, frequencies, and phases increases, so that the parametric encoding method may be inefficient. Accordingly, the parametric encoding method is suitable for audio encoding and decoding apparatuses (i.e., audio codec) having a low target bit rate, but it is not suitable for audio encoding and decoding apparatuses having a high quality or a high target bit rate.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides audio encoding and decoding apparatuses capable of recovering a high-quality audio signal at a low bit rate.

According to an aspect of the present invention, there is provided an audio encoding method comprising: detecting at least one sinusoidal wave from an input audio signal; calculating components of additional basis vectors by using residual audio signals and the additional basis vectors of the sinusoidal wave; determining transmission of components of the additional basis vectors; and encoding frequencies and/or phases and amplitudes of the sinusoidal waves when the transmission of the components of the additional basis vectors is determined, wherein the residual audio signals are obtained by excluding the detected sinusoidal waves from the input audio signal.

According to another aspect of the present invention, there is provided an audio decoding method comprising: parsing an encoded audio signal; recovering sinusoidal waves by decoding encoded frequencies and/or encoded phases and encoded amplitudes obtained in the parsing; recovering residual audio signals by decoding components of additional basis vectors obtained in the parsing; and generating a recovered audio signal by mixing the recovered sinusoidal waves and the recovered residual audio signals, wherein the residual audio signals are obtained by excluding the detected sinusoidal waves from the input audio signal in audio signal encoding.

According to another aspect of the present invention, there is provided an audio encoding method comprising: segmenting an input audio signal in units of a specific length; detecting at least one sinusoidal wave from segmented audio signals; quantizing frequencies and/or phases and amplitudes of the detected sinusoidal waves; de-quantizing the quantized frequencies and/or the quantized phases and the quantized amplitudes; determining transmission of components of additional basis vectors of the detected sinusoidal waves based on the de-quantized frequencies and/or the de-quantized phases, the de-quantized amplitudes, residual audio signals, and a predetermined reference value; and encoding the quantized frequencies and/or the quantized phases, the quantized amplitudes, and a signal generated in the determination of the transmission of the components of the additional basis vectors, wherein the residual audio signals are obtained by excluding the detected sinusoidal waves from the segmented audio signals.

According to another aspect of the present invention, there is provided an audio decoding method comprising: parsing an encoded audio signal; de-quantizing quantized frequencies and/or quantized phases and quantized amplitudes obtained in the parsing; decoding control parameters obtained in the parsing; decoding components of additional basis vectors obtained in the parsing; recovering sinusoidal waves based on the de-quantized frequencies and/or the de-quantized phases and the de-quantized amplitudes; deriving the additional basis vectors based on the de-quantized frequencies and/or the de-quantized phases, the de-quantized amplitudes, and the decoded control parameters; recovering residual audio signals based on the derived additional basis vectors and the decoded components of the additional basis vectors; and recovering an audio signal by mixing the recovered sinusoidal waves and the recovered residual audio signals, wherein the residual audio signals are obtained by removing the detected sinusoidal waves from the segmented audio signals in the audio encoding.

According to another aspect of the present invention, there is provided an audio encoding apparatus comprising: a segmentation unit segmenting an input audio signal in units of a specific length; a sinusoidal wave detection unit detecting at least one sinusoidal wave from segmented audio signals; a quantization unit quantizing frequencies and/or phases and amplitudes of the sinusoidal waves detected by the sinusoidal wave detection unit; a de-quantization unit de-quantizing the quantized frequencies and/or the quantized phases and the quantized amplitudes output from the quantization unit; an additional basis vector component transmission determination unit determining transmission of components of the additional basis vectors of the detected sinusoidal waves based on the de-quantized frequencies and/or the de-quantized phases and the de-quantized amplitudes output from the de-quantization unit, residual audio signals, and a predetermined reference value; and an encoding unit encoding the quantized frequencies and/or the quantized phases and the quantized amplitudes output from the quantization unit and a signal output from the additional basis vector component transmission determination unit, wherein the residual audio signals are obtained by excluding the sinusoidal waves detected by the sanding wave detection unit from the segmented audio signals.

According to another aspect of the present invention, there is provided an audio decoding apparatus comprising: a parsing unit parsing an encoded audio signal; a de-quantization unit de-quantizing quantized frequencies and/or quantized phases and quantized amplitudes output from the parsing unit; a sinusoidal wave recovering unit recovering sinusoidal waves based on the de-quantized frequencies and/or the de-quantized phases and the de-quantized amplitudes output form the de-quantization unit; a control parameter decoding unit decoding control parameters output from the parsing unit; an additional basis vector derivation unit deriving the additional basis vectors based on the de-quantized frequencies and/or the de-quantized phase and the de-quantized amplitudes output from the de-quantization unit and the decoded control parameters; an additional basis vector component decoding unit decoding the components of the additional basis vectors output from the parsing unit; a residual audio signal recovering unit recovering residual audio signals based on the additional basis vectors derived by the additional basis vector derivation unit and the decoded components of the additional basis vectors; and a mixing unit mixing the sinusoidal waves recovered by the sinusoidal wave recovering unit and the residual audio signals recovered by the residual audio signal recovering unit to output a recovered audio signal, wherein the residual audio signals are obtained by removing the detected sinusoidal waves from the segmented audio signals in the audio encoding.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention are described in detail with reference to the accompanying drawings.

Figure 1:
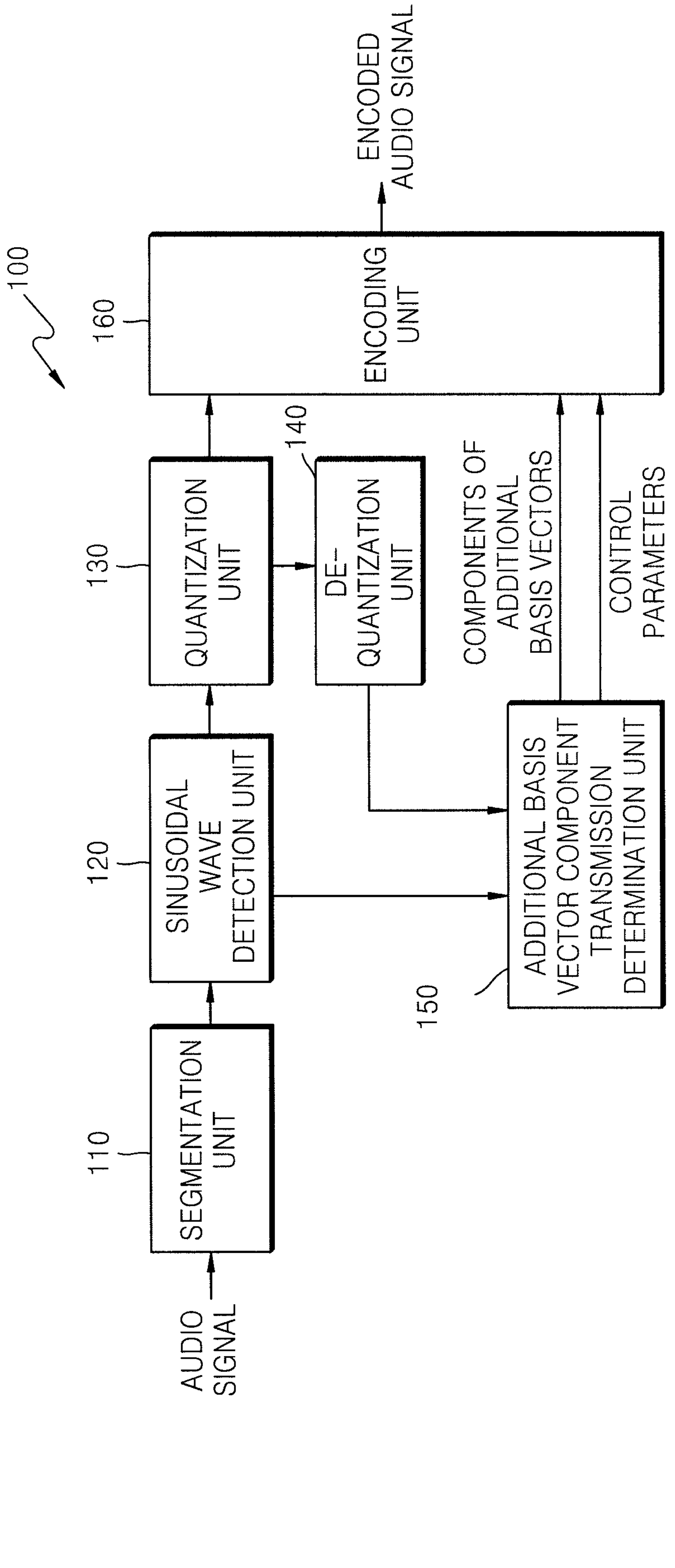
FIG. 1 is a functional block diagram showing an audio encoding apparatus according to an exemplary embodiment of the present invention.

FIG. 1 is a functional block diagram showing an audio encoding apparatus 100 according to an exemplary embodiment of the present invention. Referring to FIG. 1, the audio encoding apparatus 100 includes a segmentation unit 110, a sinusoidal wave detection unit 120, a quantization unit 130, a de-quantization unit 140, an additional basis vector component transmission determination unit 150, and an encoding unit 160.

The segmentation unit 110 segments an input audio signal in units of specific length L according to time. The segmented audio signal output from the segmentation unit 110 is denoted by S(n), where n is a time index defined by n=1~L. When the input audio signal is segmented in units of the specific length L, the segmented audio signal may be overlapped with the previously segmented audio signal by L/2 or a special length.

The sinusoidal wave detection unit 120 detects at least one sinusoidal wave from the segmented audio signals by using a matching tracking scheme. Firstly, the sinusoidal wave detection unit 120 detects a sinusoidal wave having the largest amplitude among the segmented audio signals. Next, the sinusoidal wave detection unit 120 detects a sinusoidal wave having the next largest amplitude among the segmented audio signals excluding the above detected sinusoidal wave. Until the amplitude of the detected sinusoidal wave becomes a predetermined amplitude which is previously determined based on a target bit rate, the sinusoidal wave detection unit 120 repeats the operation of detecting the sinusoidal wave among the segmented audio signals.

Therefore, even in a case where a high quality audio signal is represented, the sinusoidal wave detection unit 120 does not detect a sinusoidal wave having an amplitude smaller than the predetermined amplitude among the segmented audio signals.

The sinusoidal waves detected by the sinusoidal wave detection unit 120 may be denoted by Equation 1.

$$a_i v_i(n) \quad \text{[Equation 1]}$$

The $a_i$ denotes each amplitude of detected sinusoidal waves and constitutes each component of basis vectors of the detected sinusoidal waves. The $v_i$ denotes each of the basis vectors of the detected sinusoidal waves and can be represented by frequencies $k_i$ and phases $\phi_i$ as shown in Equation 2.

$$v_i(n) \equiv A \sin(2\pi k_i n/L + \phi_i) \quad \text{[Equation 2]}$$

The "A" is a normalization constant for normalizing $v_i(n)$ so that $$\sum_{i=1}^{K} v_i(n)$$

is equal to 1. The "i" is an index of each of the detected sinusoidal waves. If the number of the sinusoidal waves detected by the sinusoidal wave detection unit 120 is K, the index i ranges from 1 to K.

The quantization unit 130 quantizes the frequencies $k_i$ and/or the phases $\phi_i$ and the amplitudes $a_i$ of the sinusoidal waves detected by the sinusoidal wave detection unit 120.

The de-quantization unit 140 de-quantizes the quantized frequencies $\tilde{k}_i$ and/or the quantized phases $\tilde{\phi}_i$ and the quantized amplitudes $\tilde{a}_i$ output from the quantization unit 130.

The additional basis vector component transmission determination unit 150 determines transmission of the components of the additional basis vectors of the detected sinusoidal waves. More specifically, the additional basis vector component transmission determination unit 150 determines transmission of the components of the additional basis vectors of the detected sinusoidal waves based on the de-quantized frequencies and/or the de-quantized phases and the de-quantized amplitudes output from the quantization unit 130, a residual audio signal r(n) provided by the sinusoidal wave detection unit 120, and predetermined reference values.

The residual audio signal r(n) is an audio signal obtained by excluding the sinusoidal waves detected by the sinusoidal wave detection unit 120 from the segmented audio signals. Therefore, the residual audio signal r(n) is defined by Equation 3.

$$r(n) = s(n) - \sum_{i=1}^{K} a_i v_i(n) \quad \text{[Equation 3]}$$

In Equation 3, $$\sum_{i=1}^{K}$$

means that k sinusoidal waves are detected among the segmented audio signals.

The predetermined reference values include the number F of to-be-derived basis vectors, a frequency variation k0 determined according to the number F of the to-be-derived basis vectors, and a reference value for determining whether or not the use of the components of the additional basis vectors is efficient. If the transmission of the components of the additional basis vectors is determined, output signals of the additional basis vector component transmission determination unit 150 include control parameters and the components of the additional basis vectors. The control parameters may include a parameter representing the transmission of the components of the additional basis vectors. In addition, the control parameters may include the parameter representing the transmission of the components of the additional basis vectors and a parameter representing a derivation scheme for the additional basis vectors.

Figure 2:
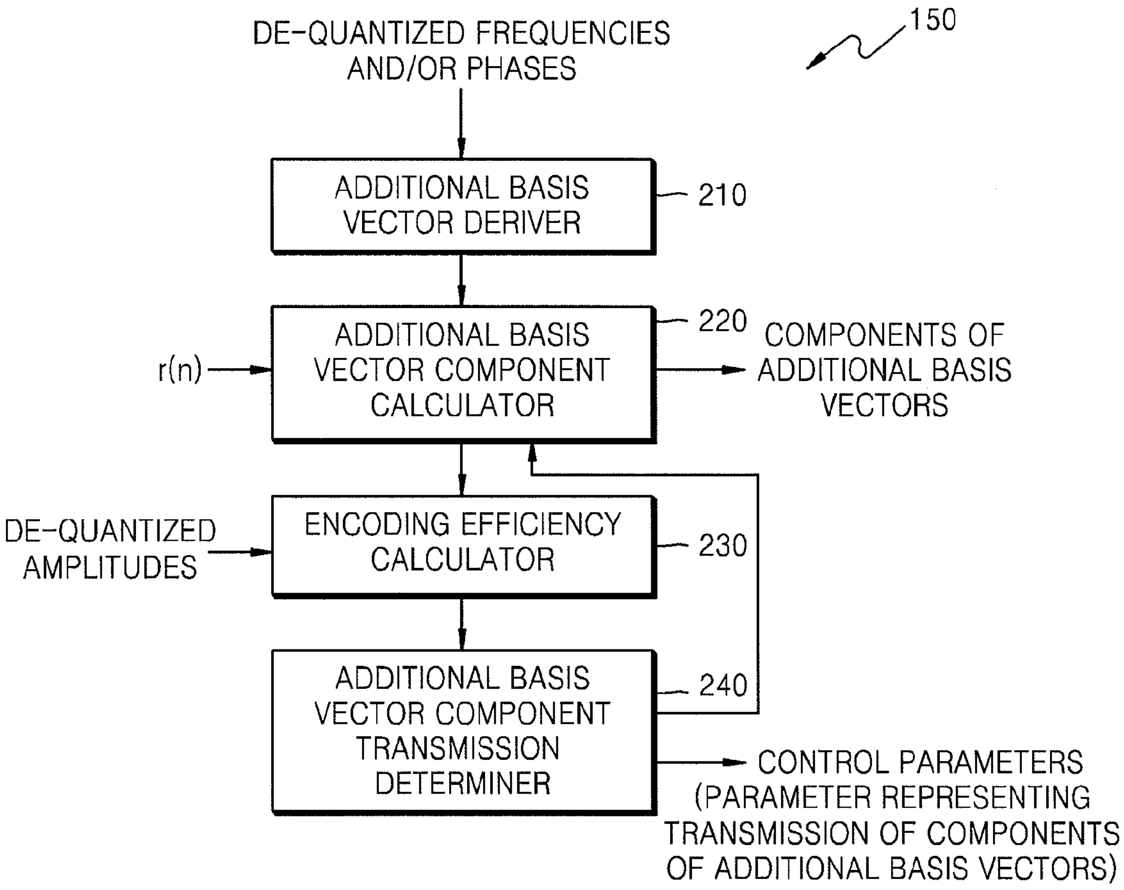
FIG. 2 is a detailed functional block diagram showing an example of an additional basis vector component transmission determination unit shown in FIG. 1.

The additional basis vector component transmission determination unit 150 may be constructed as shown in FIG. 2. Referring to FIG. 2, the additional basis vector component transmission determination unit 150 includes an additional basis vector deriver 210, an additional basis vector component calculator 220, an encoding efficiency calculator 230, and an additional basis vector component transmission determiner 240.

The additional basis vector deriver 210 derives the additional basis vectors of the sinusoidal waves detected by the sinusoidal wave detection unit 120. More specifically, the additional basis vector deriver 210 derives the additional basis vectors of the detected sinusoidal waves by using the number F of the to-be-derived basis vectors, the frequency variation k0 determined according to the number F of the to-be-derived basis vectors, and the de-quantized frequencies $\tilde{k}_i$ and/or the de-quantized phases $\tilde{\phi}_i$. A plurality of the basis vectors may be derived from one sinusoidal wave. In a case where the number F of the to-be-derived basis vectors is set to 2, the additional basis vector deriver 210 may derive the additional basis vectors $w^{\alpha}_i$ as shown in Equation 4. The $\alpha$ in $w^{\alpha}_i$ is an index of the derived additional basis vector.

$$w^1_i(n) = \sin(2\pi(\tilde{k}_i + 1/2)n/L + \tilde{\phi}'_i)$$

$$w^2_i(n) = \sin(2\pi(\tilde{k}_i - 1/2)n/L + \tilde{\phi}''_i) \quad \text{[Equation 4]}$$

In this case, since the number F of the to-be-derived basis vectors is set to 2, the frequency variation k0 determined according to the number F of the to-be-derived basis vectors becomes ±½. The phases $\tilde{\phi}'_i$ and $\tilde{\phi}''_i$ are determined by the audio encoding apparatus 100 and an audio decoding apparatus 400 (see FIG. 4), respectively, so that Equation 5 is satisfied.

$$\sum_{n=1}^{L} v_i(n) w_i(n) = 0 \quad \text{[Equation 5]}$$

The $w_i(n)$ denotes the additional basis vectors which are perpendicular to the sinusoidal waves. It can be understood from Equations 4 and 5 that the derived basis vectors and the detected sinusoidal waves have different frequencies and are perpendicular to each other.

In a case where the number F of the to-be-derived basis vectors is set to 4, the additional basis vector deriver 210 may derive the additional basis vectors as shown in Equation 6.

$$w^1_i(n) = \sin(2\pi(k_i + k0)n/L)$$

$$w^2_i(n) = \sin(2\pi(k_i + k0)n/L + \pi/2)$$

$$w^3_i(n) = \sin(2\pi(k_i - k0)n/L)$$

$$w^4_i(n) = \sin(2\pi(k_i - k0)n/L + \pi/2) \quad \text{[Equation 6]}$$

If the frequency variation k0 is 1 in Equation 6, the sine and cosine waves having frequencies which are higher and lower by 1 than the frequency of the detected sinusoidal wave becomes the derived additional basis vectors.

The additional basis vector component calculator 220 calculates the components $a^{\alpha}_{i}$ of the additional basis vectors by using the residual audio signal r(n) and the additional basis vectors $w^{\alpha}_{i}$ derived by the additional basis vector deriver 210 in Equation 7.

$$a_i^{\alpha} = \sum_{n=1}^{L} r(n) w_i^{\alpha}(n) \quad \text{[Equation 7]}$$

In Equation 7, the $$\sum_{n=1}^{L}$$

means that the $a^{\alpha}_{i}$ is the component of the additional basis vectors $w^{\alpha}_{i}$ of the segmented audio signals which are segmented in units of a specific length L. Namely, the component $a^{\alpha}_{i}$ of the additional basis vectors per the derived additional basis vector is calculated. For example, in a case where the number of the derived additional basis vectors is 2 as shown in Equation 4, two components $a^{\alpha}_{i}$, that is, $a^{1}_{i}$ and $a^{2}_{i}$ of the additional basis vectors are calculated. Similarly, in a case where the number of the derived additional basis vectors is 4 as shown in Equation 6, four components $a^{\alpha}_{i}$, that is, $a^{1}_{i}$, $a^{2}_{i}$, $a^{3}_{i}$, and $a^{4}_{i}$ of the additional basis vectors are obtained.

The additional basis vector component calculator 220 transmits the components of the additional basis vectors to the encoding efficiency calculator 230. When the additional basis vector component transmission determiner 240 determines the transmission of the components of the additional basis vectors, the components of the additional basis vectors are transmitted to the encoding unit 160.

The encoding efficiency calculator 230 calculates an encoding efficiency of each of the sinusoidal waves by using the components $a^{\alpha}_{i}$ of the additional basis vectors, the de-quantized amplitudes $\tilde{a}_i$, and the predetermined number F of the derived basis vectors as shown in Equation 8.

$$\text{efficiency} = \sqrt{\frac{\sum_{\alpha=1}^{F} (a_i^{\alpha})^2}{F \cdot (\tilde{a}_i)^2}} \quad \text{[Equation 8]}$$

The additional basis vector component transmission determiner 240 compares the encoding efficiency calculated by the encoding efficiency calculator 230 with the predetermined reference value. The predetermined reference value is used to determine whether or not the use of the components of the additional basis vectors is efficient.

As a result of the comparison, if the encoding efficiency is larger than the predetermined reference value, the additional basis vector component transmission determiner 240 determines that the transmission of the components of the additional basis vectors is efficient. Accordingly, the additional basis vector component transmission determiner 240 transmits to the encoding unit 160 the control parameters for controlling the output of the components of the additional basis vectors and including the parameters representing the transmission of the components of the additional basis vectors.

If the additional basis vector component transmission determiner 240 determines that no transmission of the components of the additional basis vectors is efficient, the additional basis vector component transmission determiner 240 does not transmit to the encoding unit 160 the components of the additional basis vectors calculated by the additional basis vector component calculator 220. In this case, the control parameters output from the additional basis vector component transmission determiner 240 includes a parameter representing no transmission of the components of the additional basis vectors.

Figure 3:
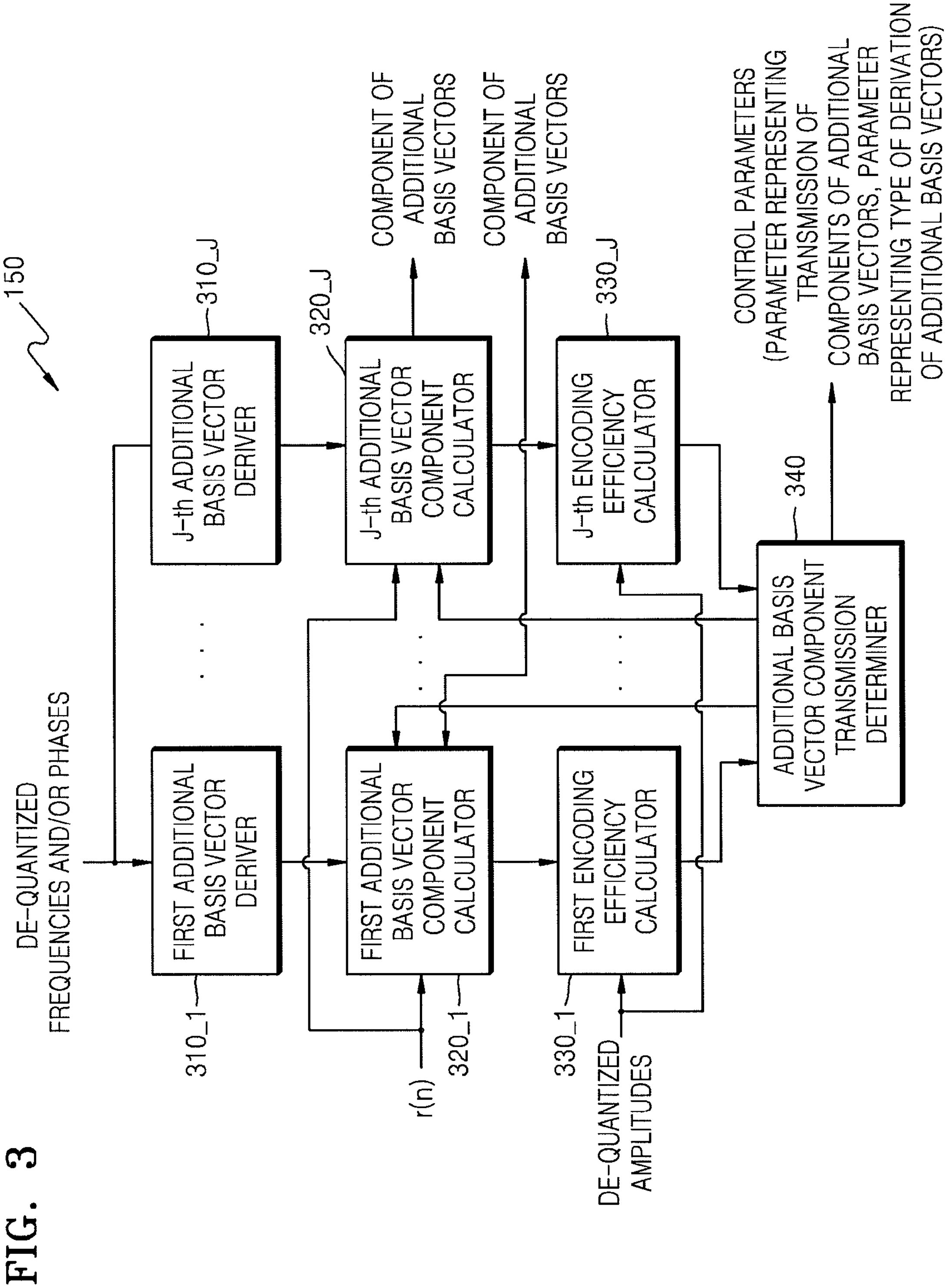
FIG. 3 is a detailed functional block diagram showing another example of the additional basis vector component transmission determination unit shown in FIG. 1.

The additional basis vector component transmission determination unit 150 may be constructed as shown in FIG. 3. Referring to FIG. 3, the additional basis vector component transmission determination unit 150 includes first to J-th additional basis vector derivers 310_1 to 310_J, first to J-th additional basis vector component calculators 320_1 to 320_J, first to J-th encoding efficiency calculators 330_1 to 330_J, and additional basis vector component transmission determiner 340.

Constructions and operations of the first to J-th additional basis vector derivers 310_1 to 310_J are similar to those of the additional basis vector deriver 210 shown in FIG. 2. However, the number F of the basis vectors and the frequency variation k0 (determined according to the number F of the basis vectors) are set to be different among the first to J-th additional basis vector derivers 310_1 to 310_J. For example, in the first additional basis vector deriver 310_1, the number F of the additional basis vectors is set to 2, and the frequency variation k0 is set to ±½, so that the additional basis vectors shown in Equation 4 can be derived. On the other hand, in the J-h additional basis vector deriver 310_J, the number F of the additional basis vectors is set to 4, and the frequency variation k0 is set to ±1, so that the additional basis vectors shown in Equation 6 can be derived. The number F and the frequency variation of each of the additional basis vector derivers (not shown) between the first and J-th additional basis vector derivers 310_1 and 310_J are set to be different from those of the first and J-th additional basis vector derivers 310_1 and 310_J.

Similar to the additional basis vector component calculator 220 shown in FIG. 2, each of the first to J-th additional basis vector component calculators 320_1 to 320_J calculates the components $a^{\alpha}_{i}$ of the additional basis vectors by using the residual audio signal r(n) and the additional basis vectors $w^{\alpha}_{i}$ derived by the corresponding additional basis vector deriver among the additional basis vector derivers 310_1 to 310_J in Equation 7. For example, the first additional basis vector component calculators 320_1 corresponds to the first additional basis vector deriver 310_1.

Each of the first to J-th encoding efficiency calculators 330_1 to 330_J calculates the encoding efficiency of each of the sinusoidal waves by using the components $a^{\alpha}_{i}$ of the additional basis vectors calculated by the corresponding one among the first to J-th additional basis vector component calculators 320_1 to 320_J, the de-quantized amplitudes $\tilde{a}_i$, and the predetermined number F of the derived basis vectors as shown in Equation 8. The first encoding efficiency calculator 330_1 corresponds to the first additional basis vector component calculator 320_1.

The additional basis vector component transmission determiner 340 compares the encoding efficiencies calculated by the first to J-th encoding efficiency calculators 330_1 to 330_J to detect the highest encoding efficiency. Next, the additional basis vector component transmission determiner 340 compares the highest encoding efficiency with the predetermined reference value. The predetermined reference value is used to determine whether the use of the components of the additional basis vectors is efficient.

As a result of the comparison, if the highest encoding efficiency is larger than the predetermined reference value, the additional basis vector component transmission determiner 340 determines that the transmission of the components of the additional basis vectors is efficient. Accordingly, the additional basis vector component transmission determiner 340 transmits to the encoding unit 160 the control parameters for controlling the output of the components of the additional basis vectors calculated by the additional basis vector component calculator corresponding to the encoding efficiency calculator detecting the highest encoding efficiency among the first to J-th additional basis vector component calculators 320_1 to 320_J.

The control parameters output from the additional basis vector component transmission determiner 340 include the parameters representing the transmission of the components of the additional basis vectors and a parameter representing a derivation scheme for the additional basis vectors. The parameter representing the derivation scheme for the additional basis vectors includes identification information of the additional basis vector component calculator corresponding to the encoding efficiency calculator having the highest encoding efficiency among the first to J-th additional basis vector component calculators 320_1 to 320_J. For example, if the encoding efficiency calculated by the first encoding efficiency calculator 330_1 corresponding to the first additional basis vector deriver 310_1 is highest, the parameter representing the derivation scheme for the additional basis vectors includes the identification information of the first additional basis vector deriver 310_1.

If the additional basis vector component transmission determiner 340 determines that no transmission of the components of the additional basis vectors is efficient, the additional basis vector component transmission determiner 340 does not transmits to the encoding unit 160 the components of the additional basis vectors calculated by the first to J-th additional basis vector component calculators 320_1 to 320_J. In this case, the control parameters output from the additional basis vector component transmission determiner 340 includes a parameter representing no transmission of the components of the additional basis vectors.

The encoding unit 160 shown in FIG. 1 encodes the quantized frequencies and/or the quantized phases, and the quantized amplitudes output from the quantization unit 130 and the signals output from the additional basis vector component transmission determination unit 150 and outputs the encoded audio signals. When the components of the additional basis vectors are transmitted, the signals output from the additional basis vector component transmission determination unit 150 include the components of the additional basis vectors and the control parameters as described above. In a case where the additional basis vector component transmission determination unit 150 is constructed as shown in FIG. 2, the control parameters include the parameter representing the transmission of the components of the additional basis vectors. On the other hand, in a case where the additional basis vector component transmission determination unit 150 is constructed as shown in FIG. 3, the control parameters include the parameter representing the transmission of the components of the additional basis vectors and the parameter representing the derivation scheme for the additional basis vectors.

When the components of the additional basis vectors are not transmitted, the signals output from the additional basis vector component transmission determination unit 150 include the control parameters excluding the components of the additional basis vectors. In this case, the control parameters include the parameter representing no transmission of the components of the additional basis vectors.

Figure 4:
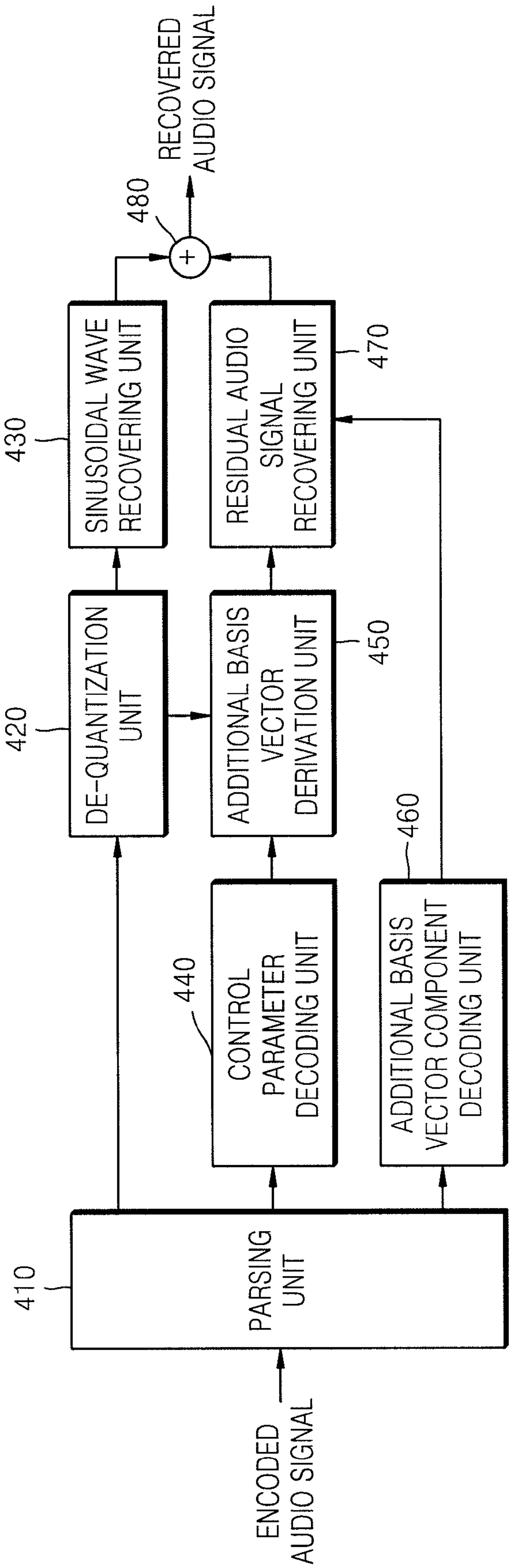
FIG. 4 is a functional block diagram showing an audio decoding apparatus according to an exemplary embodiment of the present invention.

FIG. 4 is a functional block diagram showing an audio decoding apparatus 400 according to an exemplary embodiment of the present invention. Referring to FIG. 4, the audio decoding apparatus 400 includes a parsing unit 410, a de-quantization unit 420, a sinusoidal wave recovering unit 430, a control parameter decoding unit 440, an additional basis vector derivation unit 450, an additional basis vector component decoding unit 460, a residual audio signal recovering unit 470, and a mixing unit 480.

When an encoded audio signal is input, the parsing unit 410 parses the encoded audio signal and transmits to the de-quantization unit 420 quantized frequencies and/or quantized phases and quantized amplitudes. Also, the parsing unit 410 transmits control parameters to the control parameter decoding unit 440. In addition, the parsing unit 410 transmits components of additional basis vectors to the additional basis vector component decoding unit 460.

The de-quantization unit 420 de-quantizes the quantized frequencies and/or the quantized phases and the quantized amplitudes. The control parameter decoding unit 440 decodes the control parameters. The sinusoidal wave recovering unit 430 recovers sinusoidal waves based on the de-quantized frequencies and/or the de-quantized phases and the de-quantized amplitudes. If K sinusoidal waves are detected at the time of encoding the audio signal, the sinusoidal waves are recovered based on K de-quantized frequencies and/or K de-quantized phases and K de-quantized amplitudes.

The additional basis vector derivation unit 450 derives the additional basis vectors based on the de-quantized frequencies and/or the de-quantized phases and the de-quantized amplitudes provided by the de-quantization unit 420 and the control parameters provided by the control parameter decoding unit 440. In a case where the additional basis vector component transmission determination unit 150 of the audio encoding apparatus 100 is constructed as shown in FIG. 2, the additional basis vector derivation unit 450 may be constructed with the additional basis vector deriver 210 of FIG. 2 to derive the additional basis vectors.

On the other hand, in a case where the additional basis vector component transmission determination unit 150 of the audio encoding apparatus 100 is constructed as shown in FIG. 3, the additional basis vector derivation unit 450 may be constructed with the first to J-th additional basis vector derivers 310_1 to 310_J of FIG. 3 to select one of the first to J-th additional basis vector derivers 310_1 to 310_J according to the decoded control parameter and derive the additional basis vectors. The additional basis vectors may be derived by Equation 4 or 6. For the additional basis vector derivation unit 450, the number F of the additional basis vectors and frequency variations k0 determined according to the number F of the additional basis vectors may be set in advance. Alternatively, in a case where the audio encoding apparatus 100 transmits the control parameters including the number F of the additional basis vectors and the frequency variations k0, the additional basis vector derivation unit 450 may be constructed to use the number F of the additional basis vectors and the frequency variations k0 provided by the control parameter decoding unit 440. The additional basis vectors derived by the additional basis vector derivation unit 450 are transmitted to the residual audio signal recovering unit 470.

The additional basis vector component decoding unit 460 decodes the components of the additional basis vectors provided by the parsing unit 410.

The residual audio signal recovering unit 470 recovers residual audio signals r(n) based on the components of the additional basis vectors transmitted from the additional basis vector component decoding unit 460 and the additional basis vectors derived by the additional basis vector derivation unit 450.

The mixing unit 480 mixes the sinusoidal waves recovered by the sinusoidal wave recovering unit 430 and the residual audio signals recovered by the residual audio signal recovering unit 470 and outputs the recovered audio signals.

Figure 5:
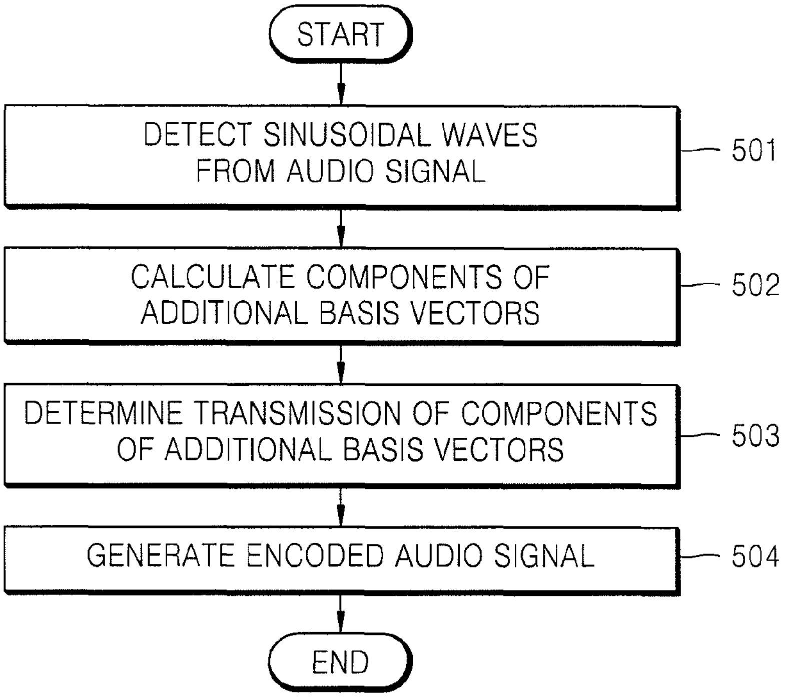
FIG. 5 is a flowchart showing operations of an audio encoding method according to an exemplary embodiment of the present invention.

FIG. 5 is a flowchart showing operations of an audio encoding method according to an exemplary embodiment of the present invention.

In the audio encoding method, at least one sinusoidal wave is detected from an input audio signal (501). In the operation 501, the sinusoidal waves having amplitudes larger than an amplitude determined according to a target bit rate are detected. The detailed operation of detecting the sinusoidal waves may be performed in a manner similar to that of the sinusoidal wave detection unit 120 of FIG. 1.

Next, components of additional basis vectors are calculated by using residual audio signals and the additional basis vectors of the sinusoidal waves (502). Namely, the additional basis vectors of the sinusoidal waves detected in operation 501 are derived. The additional basis vectors may be derived in a manner similar to that of the additional basis vector deriver 210 of FIG. 2. When the additional basis vectors of the sinusoidal waves are derived, the components of the derived additional basis vectors are calculated by using the residual audio signals. The residual audio signal is an audio signal obtained by excluding the sinusoidal waves from the input audio signal. The components of the additional basis vectors may be calculated in a manner similar to that of the additional basis vector component calculator 220 of FIG. 2.

Next, it is determined whether the components of the additional basis vectors are transmitted (503). Namely, encoding efficiencies of the sinusoidal waves are calculated based on the components of the additional basis vectors calculated in operation 502. The encoding efficiencies may be calculated in a manner similar to that of the encoding efficiency calculator 230 of FIG. 2. If the calculated encoding efficiency is higher than a predetermined reference value, the components of the additional basis vectors are determined to be transmitted. The reference value is similar to that of the additional basis vector component transmission determiner 240 of FIG. 2.

When the components of the additional basis vectors are determined to be transmitted, frequencies and/or phases and amplitudes of the detected sinusoidal waves and the components of the additional basis vectors calculated in operation 502 are encoded to generate an encoded audio signal (504).

Figure 6:
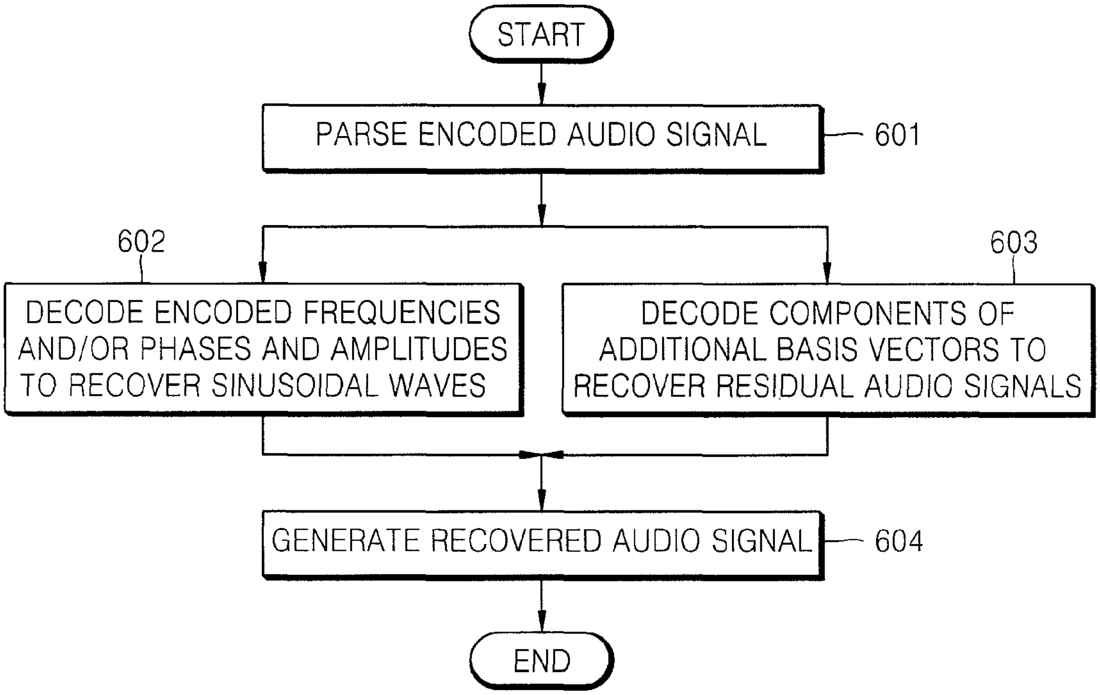
FIG. 6 is a flowchart showing operations of an audio decoding method corresponding to the audio encoding method shown in FIG. 5.

An audio decoding method corresponding to the audio encoding method of FIG. 5 is shown in FIG. 6. FIG. 6 is a flowchart showing operations of the audio decoding method according to an exemplary embodiment of the present invention.

Referring to FIG. 6, in the audio decoding method, when the encoded audio signal is input, the encoded audio signal is parsed (601). When encoded frequencies and/or encoded phases and encoded amplitudes are obtained by the parsing, the encoded frequencies and/or encoded phases and encoded amplitudes are decoded to recover the sinusoidal waves (602). In addition, when the components of the additional basis vectors are obtained by the parsing, the components of the additional basis vectors are decoded to recover the residual audio signals (603). The residual audio signal is an audio signal obtained by excluding the sinusoidal waves detected in the encoding of the input audio signal from the input audio signal.

Next, the recovered sinusoidal waves and the recovered residual audio signals are mixed to generate a recovered audio signal (604).

Figure 7:
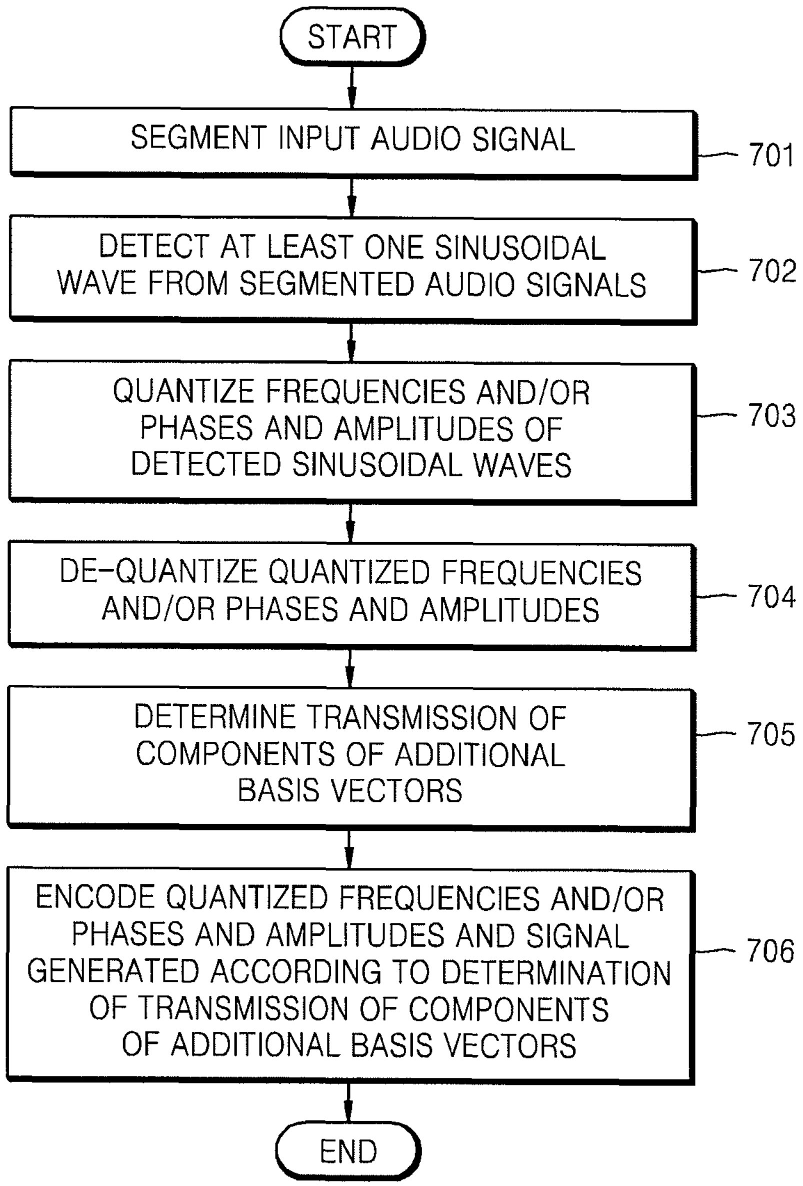
FIG. 7 is a flowchart showing operations of an audio encoding method according to an exemplary embodiment of the present invention.

FIG. 7 is a flowchart showing operations of an audio encoding method according to an exemplary embodiment of the present invention. The flowchart of the operations is described with reference to FIGS. 1 and 7.

First, in a manner similar to that of the segmentation unit 110 of FIG. 1, an input audio signal is segmented in units of a specific length (701). Next, in a manner similar to that of the sinusoidal wave detection unit 120 of FIG. 1, at least one sinusoidal wave is detected from the segmented audio signals (702).

Next, in a manner similar to that of the quantization unit 130 of FIG. 1, frequencies and/or phases and amplitudes of the detected sinusoidal waves are quantized (703). Next, in a manner similar to that of the de-quantization unit 140 of FIG. 1, the quantized frequencies and/or the quantized phases and the quantized amplitudes are de-quantized (704).

Next, in a manner similar to that of the additional basis vector component transmission determination unit 150 of FIG. 1, it is determined based on the de-quantized frequencies and/or the de-quantized phases and the de-quantized amplitudes whether components of additional basis vectors of the detected sanding waves are transmitted (705).

Figure 8:
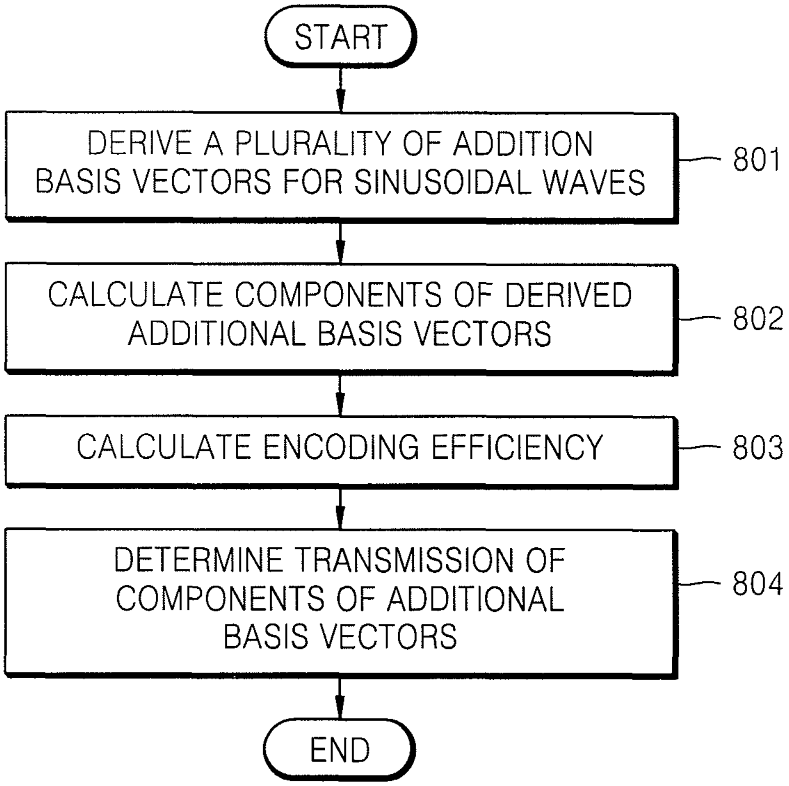
FIG. 8 is a flowchart showing detailed operations of an operation of determining transmission of components of additional basis vectors shown in FIG. 7.

Operation 705 may be performed as shown in FIG. 8. FIG. 8 is a flowchart showing detailed operations of operation 705 of determining transmission of the components of the additional basis vectors. Referring to FIG. 8, in a manner similar to that of the additional basis vector deriver 210 of FIG. 2, in operation 705 of determining transmission of the components of the additional basis vectors, a plurality of the additional basis vectors of the detected sinusoidal waves are derived (801).

Next, in a manner similar to that of the additional basis vector component calculator 220 of FIG. 2, the components of the derived additional basis vectors are calculated (802). Next, in a manner similar to that of the encoding efficiency calculator 230 of FIG. 2, an encoding efficiency of the detected sinusoidal waves are calculated by using the components of the additional basis vectors of the detected sinusoidal waves (803).

Next, in a manner similar to that of the additional basis vector component transmission determiner 240, it is determined based on the encoding efficiency whether or not the components of the additional basis vectors are transmitted (804).

In a manner similar to the first to J-th additional basis vector derivers 310_1 to 310_J of FIG. 1, the components of the additional basis vectors may be derived (801). Therefore, a plurality of the additional basis vectors may be derived based on the number F of the (two or more) additional basis vectors and frequency variations k0 determined according to the number F of the (two or more) additional basis vectors.

In a manner similar to that of first to J-th additional basis vector component calculators 320_1 to 320_J of FIG. 3, the components of the additional basis vectors may be calculated (802). Therefore, a plurality of the components of the derived additional basis vectors may be calculated based on the number F of the (two or more) additional basis vectors and the frequency variations k0 determined according to the number F of the (two or more) additional basis vectors.

In a manner similar to that of the first to J-th encoding efficiency calculators 330_1 to 330_J of FIG. 3, the encoding efficiencies of the sinusoidal waves may be calculated (803). Therefore, the encoding efficiencies may be calculated based on the number F of the (two or more) additional basis vectors and the frequency variations k0 determined according to the number F of the (two or more) additional basis vectors by using the components of the additional basis vectors of the detected sinusoidal waves.

In a manner similar to that of the additional basis vector component transmission determiner 340 of FIG. 3, it is determined whether or not the components of the additional basis vectors are transmitted (804). Therefore, it is determined based on the highest encoding efficiency whether or not the components of the additional basis vectors are transmitted.

As described above, when the transmission of the components of the additional basis vectors is determined, the quantized frequencies and/or the quantized phases, the quantized amplitudes, and a signal generated in determination of the transmission of the components of the additional basis vectors are encoded (706). The signal generated in determination of the transmission of the components of the additional basis vectors includes the control parameters described with reference to FIGS. 1 to 3 and the components of the additional basis vectors.

Figure 9:
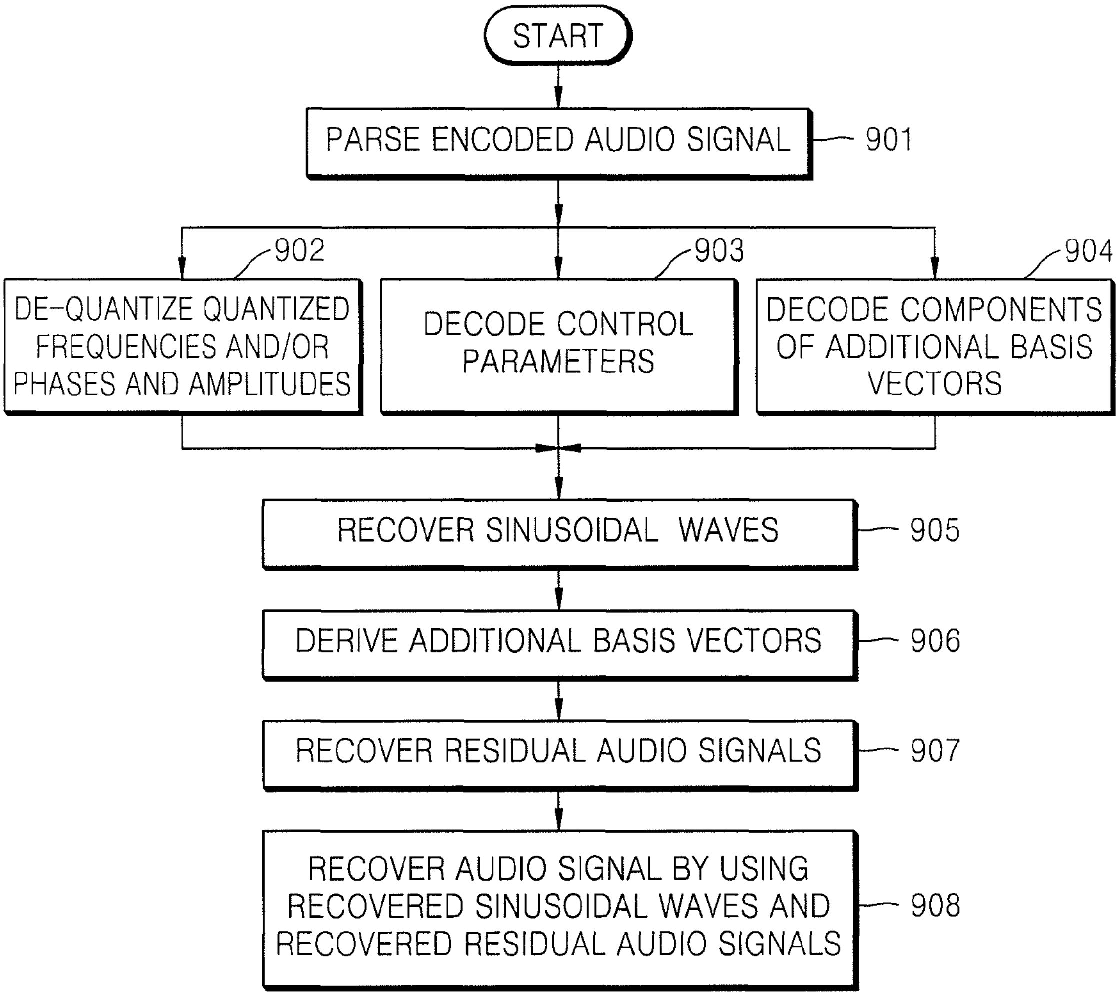
FIG. 9 is a flowchart showing an audio decoding method corresponding to the audio encoding method shown in FIG. 7.

FIG. 9 is a flowchart showing an audio decoding method corresponding to the audio encoding method shown in FIG. 7. Operations of the audio decoding method are described with reference to FIGS. 4 and 9.

First, in a manner similar to that of the parsing unit 410 of FIG. 4, an encoded audio signal is parsed (901). Next, in a manner similar to that of the de-quantization unit 420 of FIG. 4, quantized frequencies and/or quantized phases and quantized amplitudes obtained in the parsing are de-quantized (902). In a manner similar to that of the control parameter decoding unit 440 of FIG. 4, control parameters obtained in the parsing are decoded (903). In a manner similar to that of the additional basis vector component decoding unit 460 of FIG. 4, components of additional basis vectors obtained in the parsing are decoded (904).

Next, in a manner similar to that of the sinusoidal wave recovering unit 430 of FIG. 4, the sinusoidal waves are recovered based on de-quantized frequencies and/or de-quantized phases and de-quantized amplitudes (905). Next, in a manner similar to that of the additional basis vector derivation unit 450 of FIG. 4, the additional basis vectors are derived based on the de-quantized frequencies and/or the de-quantized phases, the de-quantized amplitudes, and the decoded control parameters (906). Next, in a manner similar to that of the residual audio signal recovering unit 470 of FIG. 4, residual audio signals are recovered based on the derived additional basis vectors and the decoded components of the additional basis vectors (907). Next, in a manner similar to that of the mixing unit 480 of FIG. 4, an audio signal is recovered by using the recovered sinusoidal waves and the recovered residual audio signals (908), and the recovered audio signal is output.

Audio encoding and decoding methods according to the present invention can also be embodied as computer readable codes on a computer readable recording medium. The computer readable recording medium is any data storage device that can store data which can be thereafter read by a computer system.

Examples of the computer readable recording medium include, but are not limited to, read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the exemplary embodiments of the present invention, there is provided an audio encoding technique for encoding additional basis vectors by detecting sinusoidal waves having amplitudes larger than an amplitude determined according to a target bit rate, encoding the sinusoidal waves, calculating components of the additional basis vectors based on derived additional basis vectors of the sinusoidal waves and residual audio signals, and determining transmission of the component of the additional basis vectors based on encoding efficiencies of the sinusoidal waves obtained using the calculated additional basis vectors and an audio decoding technique corresponding to the audio encoding technique, so that it is possible to implement audio encoding and decoding methods and apparatuses (or audio codec) capable of recovering a high-quality audio signal at a low bit rate.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. An audio encoding method comprising:

detecting at least one sinusoidal wave from an input audio signal;

deriving additional basis vectors of the at least one detected sinusoidal wave using a number of to-be-derived basis vectors, a frequency variation determined according to the number of the to-be-derived basis vectors and at least one of de-quantized frequencies and de-quantized phases;

obtaining components of additional basis vectors by using residual audio signals and the derived additional basis vectors of the sinusoidal wave;

obtaining an encoding efficiency of each of the detected sinusoidal waves based on the components of the additional basis vectors, de-quantized amplitudes, and a predetermined number of the derived additional basis vectors;

determining whether or not to transmit the components of the additional basis vectors by comparing the encoding efficiency with a predetermined reference value; and encoding at least one of (a) frequencies of the sinusoidal waves and (b) phases and amplitudes of the sinusoidal waves, and the derived additional basis vectors when the transmission of the components of the additional basis vectors is determined;

wherein the residual audio signals are obtained by excluding the detected sinusoidal waves from the input audio signal.

2. The audio encoding method of claim 1, wherein the determining the transmission of the components of the additional basis vectors comprises:

transmitting the components of the additional basis vectors if the encoding efficiency is higher than a predetermined reference value.

3. The audio encoding method of claim 1, wherein in the obtaining encoding efficiencies, each of each of the encoding efficiencies is calculated by using the components $a^{\alpha}_{i}$ of the additional basis vectors, the number F of the additional basis vectors, and the de-quantized amplitudes $\tilde{a}_i$ according to the following equation:

$$\text{efficiency} = \sqrt{\frac{\sum_{\alpha=1}^{F} (a_i^{\alpha})^2}{F \cdot (\tilde{a}_i)^2}}.$$

4. An audio decoding method comprising:

parsing an encoded audio signal;

recovering sinusoidal waves by decoding at least one of (a) encoded frequencies obtained in the parsing and (b) encoded phases and encoded amplitudes obtained in the parsing;

recovering residual audio signals by decoding components of additional basis vectors obtained in the parsing; and generating a recovered audio signal by mixing the recovered sinusoidal waves and the recovered residual audio signals, wherein the residual audio signals are obtained by excluding the sinusoidal waves from an input audio signal in audio signal encoding, and the components of additional basis vectors are transmitted according to a result of a comparison of an encoding efficiency of each of sinusoidal waves obtained based on the component of the additional basis vectors and de-quantized amplitudes, and a predetermined reference value when encoding the input audio signal.

5. An audio encoding method comprising:

segmenting an input audio signal in units of a specific length;

detecting at least one sinusoidal wave from segmented audio signals;

quantizing at least one of (a) frequencies of the detected sinusoidal waves and (b) phases and amplitudes of the detected sinusoidal waves;

de-quantizing the quantized frequencies or the quantized phases and the quantized amplitudes;

determining whether or not to transmit components of additional basis vectors of the detected sinusoidal waves by comparing an encoding efficiency with a predetermined reference value, wherein the encoding efficiency is obtained based on components of additional basis vectors derived from the detected sinusoidal waves, the de-quantized amplitudes, and a predetermined number of the derived additional basis vectors; and encoding the quantized frequencies or the quantized phases, the quantized amplitudes, and a signal generated in the determination of the transmission of the components of the additional basis vectors, wherein the residual audio signals are obtained by excluding the detected sinusoidal waves from the segmented audio signals.

6. The audio encoding method of claim 5, wherein the determining the transmission of the components of the additional basis vectors comprises:

deriving a plurality of the additional basis vectors of the detected sinusoidal waves;

obtaining components of the derived additional basis vectors;

obtaining encoding efficiencies of the detected sinusoidal waves based on the components of the additional basis vectors derived from the detected sinusoidal waves, the de-quantized amplitudes, and the predetermined number of the derived additional basis vectors; and determining whether or not to transmit the components of the additional basis vectors by comparing the encoding efficiencies with the predetermined reference value.

7. The audio encoding method of claim 6, wherein in the deriving the additional basis vectors, a plurality of the additional basis vectors are derived based on a predetermined number F of the additional basis vectors and frequency variations determined according to the number F of the additional basis vectors.

8. The audio encoding method of claim 7, wherein the derived additional basis vectors have phases perpendicular to phases of the detected sinusoidal waves.

9. The audio encoding method of claim 6, wherein in the obtaining the components of the additional basis vectors, the components of the additional basis vectors are obtained by multiplying the residual audio signals with a plurality of the additional basis vectors.

10. The audio encoding method of claim 6, wherein in the obtaining of the encoding efficiencies, each of the encoding efficiencies is calculated by using the components $a^{\alpha}_{i}$ of the additional basis vectors, the number F of the additional basis vectors, and the de-quantized amplitudes $\tilde{a}_i$ according to the following equation:

$$\text{efficiency} = \sqrt{\frac{\sum_{\alpha=1}^{F} (a_i^{\alpha})^2}{F \cdot (\tilde{a}_i)^2}}.$$

11. The audio encoding method of claim 6, wherein in the determining whether or not to transmit the components of the additional basis vectors, when the encoding efficiency is higher than the predetermined reference value, the components of the additional basis vectors are transmitted.

12. The audio encoding method of claim 5, wherein the determining whether or not to transmit the components of the additional basis vectors comprises:

deriving a plurality of the additional basis vectors based on a number F of the additional basis vectors and frequency variations determined according to the number F of the additional basis vectors;

obtaining components of the derived additional basis vectors;

obtaining the encoding efficiencies of the detected sinusoidal waves based on the number F of the additional basis vectors and frequency variations k0 determined according to the number F of the additional basis vectors associated with the use of the additional basis vectors; and determining whether or not to transmit the components of the additional basis vectors based on a highest encoding efficiency among the calculated encoding efficiencies.

13. The audio encoding method of claim 12, wherein in the determining the transmission of the components of the additional basis vectors, when the highest encoding efficiency is higher than the predetermined reference value, the components of the additional basis vectors are transmitted.

14. An audio decoding method comprising:

parsing an encoded audio signal;

de-quantizing at least one of (a) quantized frequencies obtained in the parsing and (b) quantized phases and quantized amplitudes obtained in the parsing;

decoding control parameters obtained in the parsing;

decoding components of additional basis vectors obtained in the parsing, wherein the components of additional basis vectors are transmitted according to a result of a comparison of an encoding efficiency of each of sinusoidal waves detected based on the component of the additional basis vectors and de-quantized amplitudes, and a predetermined reference value when encoding the audio;

recovering sinusoidal waves based on the de-quantized frequencies or the de-quantized phases and the de-quantized amplitudes;

deriving the additional basis vectors based on the de-quantized frequencies or the de-quantized phases, the de-quantized amplitudes, and the decoded control parameters;

recovering residual audio signals based on the derived additional basis vectors and the decoded components of the additional basis vectors; and recovering an audio signal by mixing the recovered sinusoidal waves and the recovered residual audio signals, wherein the residual audio signals are obtained by removing the detected sinusoidal waves from the segmented audio signals in the audio encoding.

15. The audio decoding method of claim 14, wherein in the deriving the additional basis vectors, a plurality of the additional basis vectors are derived based on a number F of the additional basis vectors and frequency variations determined according to the number F of the additional basis vectors, and wherein the additional basis vectors are derived by selecting one of the additional basis vectors based on the decoded control parameters.

16. An audio encoding apparatus comprising:

a segmentation unit which segments an input audio signal in units of a specific length;

a sinusoidal wave detection unit which detects at least one sinusoidal wave from segmented audio signals;

a quantization unit which quantizes at least one of (a) frequencies of these sinusoidal waves detected by these sinusoidal wave detection unit and (b) phases and amplitudes of the sinusoidal waves detected by the sinusoidal wave detection unit;

a de-quantization unit which de-quantizes the quantized frequencies or the quantized phases and the quantized amplitudes output from the quantization unit;

an additional basis vector component transmission determination unit which determines transmission of components of additional basis vectors of the detected sinusoidal waves by comparing an encoding efficiency with a predetermined reference value, wherein the encoding efficiency is obtained based on components of additional basis vectors derived from the detected sinusoidal waves, the de-quantized amplitudes, and a predetermined number of the derived additional basis vectors; and an encoding unit which encodes the quantized frequencies or the quantized phases and the quantized amplitudes output from the quantization unit and a signal output from the additional basis vector component transmission determination unit, wherein the residual audio signals are obtained by excluding the sinusoidal waves detected by the sinusoidal wave detection unit from the segmented audio signals.

17. The audio encoding apparatus of claim 16, wherein when the transmission of the components of the additional basis vectors is determined, the signal output from the additional basis vector component transmission determination unit includes control signals and the components of the additional basis vectors, and wherein the control parameters include a parameter representing the transmission of the components of the additional basis vectors, or the control parameters include the parameter representing the transmission of the components of the additional basis vectors and a parameter representing a derivation scheme for the additional basis vectors.

18. The audio encoding apparatus of claim 16, wherein the sinusoidal wave detection unit uses a matching tracking method to detect the sinusoidal waves.

19. The audio encoding apparatus of claim 16, wherein the additional basis vector component transmission determination unit comprises:

an additional basis vector deriver which derives a plurality of the additional basis vectors of the sinusoidal waves detected by the sinusoidal wave detection unit;

an additional basis vector component obtainer which obtains the components of the additional basis vectors derived by the additional basis vector derivation unit; an encoding efficiency obtainer which obtains encoding efficiencies of the sinusoidal waves based on the components of the additional basis vectors derived from the detected sinusoidal waves, the de-quantized amplitudes, and a predetermined number of the derived additional basis vectors; and an additional basis vector component transmission determiner which determines transmission of the components of the additional basis vectors by comparing the encoding efficiencies with the predetermined reference value.

20. The audio encoding apparatus of claim 19, wherein the additional basis vector deriver derives a plurality of the additional basis vectors based on a predetermined number F of the additional basis vectors and frequency variations determined according to the number F of the additional basis vectors.

21. The audio encoding apparatus of claim 20, wherein the additional basis vector deriver derives additional basis vectors having phases perpendicular to those of the detected sinusoidal waves.

22. The audio encoding apparatus of claim 19, wherein the additional basis vector obtainer obtains the components of the additional basis vectors by multiplying residual audio signals with a plurality of the derived additional basis vectors.

23. The audio encoding apparatus of claim 19, wherein the encoding efficiency obtainer obtains the encoding efficiencies by using the components $a^{\alpha}_i$ of the additional basis vectors, a number F of the additional basis vectors, and the de-quantized amplitudes $\tilde{a}_i$ according to the following equation:

$$\text{efficiency} = \sqrt{\frac{\sum_{\alpha=1}^{F} (a_i^{\alpha})^2}{F \cdot (\tilde{a}_i)^2}}.$$

24. The audio encoding apparatus of claim 19, wherein the additional basis vector component transmission determination unit transmits the components of the additional basis vectors if the encoding efficiency is higher than a predetermined reference value.

25. The audio encoding apparatus of claim 16, wherein the additional basis vector component transmission determination unit comprises:

at least two additional basis vector derivers which derive a plurality of the additional basis vectors of the sinusoidal waves detected by the sinusoidal wave detection unit;

at least two additional basis vector component obtainers which correspond to the at least two additional basis vector derivation units and which obtain the components of the derived additional basis vectors;

at least two encoding efficiency obtainers which correspond to the at least two additional basis vector component obtainers and which obtain the encoding efficiencies of the sinusoidal waves associated with the use of the at least two additional basis vectors; and an additional basis vector transmission determiner which determines the transmission of the components of the additional basis vectors based on a highest encoding efficiency among the encoding efficiencies calculated by the at least two encoding efficiency obtainers.

* * * * *